Dec. 24, 1929.                T. MIDGLEY                1,740,616
                              NONSKID TIRE
                          Filed June 20, 1927

INVENTOR.
Thomas Midgley
BY
Edward C. Taylor
ATTORNEY.

Patented Dec. 24, 1929

1,740,616

UNITED STATES PATENT OFFICE

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS

NONSKID TIRE

Application filed June 20, 1927. Serial No. 199,922.

My invention relates to the production of non-slipping surfaces on rubber articles and has particular reference to the production of non-skid pneumatic tire casings. It has for one object the improvement of prior devices of this character in the matter of the permanency of attachment of the non-skid devices to the rubber articles. It has for a further object the prevention of the destruction of the rubber article by tearing of the rubber due to movement of the non-skid devices under the strain of use. It has for a further object the improvement in the method of preparing the non-skid devices themselves as well as improvements in their structure.

Referring to the drawings.

My invention has been shown as applied to a pneumatic tire casing 10 which may be of any usual or desired construction having a tread portion 11 generally constructed of a tough wear-resisting rubber composition. The suggestion has previously been made to incorporate in this rubber tread portion coils of wire which, when worn down, form staples presenting sharp surfaces flush with the outer surface of the tread. It is the particular object of this invention to improve both upon prior wire coils of this character and upon the firmness of their anchorage in the rubber tread so that when the tire is being used on the road there will be no possibility of the staples formed by the wearing of the coils becoming loosened and either coming out or cutting into the rubber.

Figure 1:
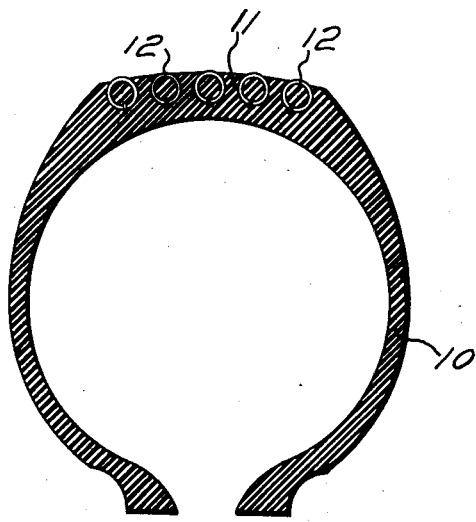
Fig. 1 is a cross-section of a tire in which my improved non-skid devices are incorporated.
Figure 3:
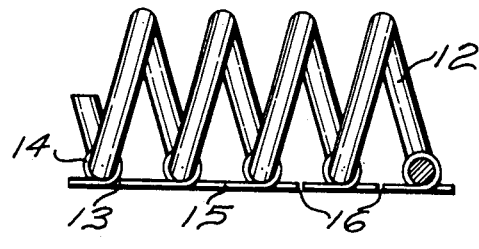
Fig. 3 is a detail on an enlarged scale of a section of one of the non-skid devices ready for incorporation into the tire.
Figure 2:
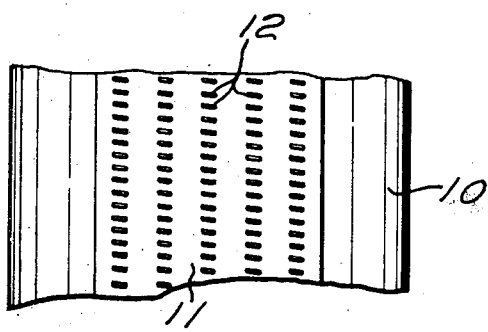
Fig. 2 is a top plan view thereof.
Figure 4:
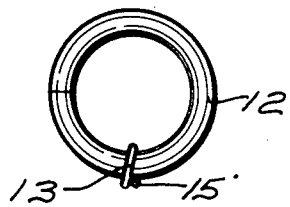
Fig. 4 is an end view of the device shown in Fig. 3.
Figure 6:
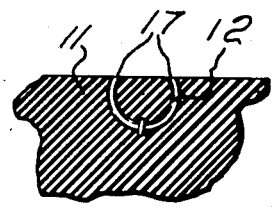
Fig. 6 is a view generally similar to Fig. 1 but on a larger scale, and illustrating the condition of the tire and the non-skid devices after the tire has been subjected to wear.
Figure 5:
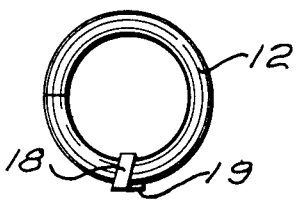
Fig. 5 is a detail of a modification.

I have shown in Fig. 3 a side elevation of one of the coils 12, which is preferably made of a high carbon steel wire. After this coil has been formed a wire 13 is looped as at 14 around the successive turns of the coil 12, leaving straight portions 15 extending between adjacent turns. The looped portions 14 of the wire 13 are then soldered, brazed or otherwise secured to the coil 12, and cuts 16 are made at points intermediate of the turns of the coil. As clearly shown at the right in Fig. 3 this leaves short anchoring devices attached to each of the turns of the coil, each anchoring device consisting of a loop 14 with two short straight portions 15 extending from it. In Fig. 5 the round wire 13 has been replaced by a flat ribbon 18 having straight portions 19 corresponding to the portions 15 previously described. This style of wire gives a still firmer anchoring in the body of the rubber.

The coil thus produced is now embedded in any desired way in the rubber of the wearing portion or tread 11 of the tire casing or other article to which it is to be applied. The tire is then completed by vulcanization in the usual way, the coil 12 being left substantially flush with the surface of the tread. Either by the wearing of the tire upon the road or as a separate factory operation the tread 11 and the outer surfaces of the coils 12 are abraded, cutting the coils at their outer portions and leaving points 17 of what may be termed "staples" formed of the remaining portion of the coils. Each of these staples, instead of being loose in the tread as was the practice in former devices of this character, is firmly anchored in the rubber by means of the portions 15 of the wire 13 which extend from each of them.

It would, of course, be possible to embed ready-made staples separately in the rubber, but the manner of manufacture described is preferable on account of cheapness, the continuous coil 12 being much easier to handle than separate unconnected staples. In either event the finished product possessing the desired non-skid qualities is the same.

Having thus described my invention, I claim:

1. A tire casing comprising a rubber tread portion, one or more spirally coiled wires positioned longitudinally of the tread portion and imbedded therein with one side of the coils substantially flush with the tread surface, and short lengths of wire looped around each coil of the spiral beneath the surface of the tread, the ends of said short wires extending longitudinally of the tread to form independent anchoring means for each coil of the spiral.

2. A structure as in claim 1 in which the longitudinally extending portions of the anchoring wires of adjacent coils of the spiral are in substantial alignment.

THOMAS MIDGLEY.